United States Patent [19]
Bak

[11] Patent Number: 6,024,491
[45] Date of Patent: Feb. 15, 2000

[54] AIR BEARING

[75] Inventor: Michael J. Bak, White Lake, Mich.

[73] Assignee: Williams International Company, L.L.C., Walled Lake, Mich.

[21] Appl. No.: 09/161,169

[22] Filed: Sep. 25, 1998

[51] Int. Cl.[7] .................................................. F16C 32/06
[52] U.S. Cl. ........................................... 384/106; 384/103
[58] Field of Search .................................. 384/103, 104, 384/105, 106

[56] References Cited

U.S. PATENT DOCUMENTS

| 4,767,222 | 8/1988 | Paletta et al. | 384/106 |
| 5,885,004 | 3/1999 | Scharrer et al. | 384/103 X |
| 5,902,049 | 5/1999 | Heshmat | 384/106 |

*Primary Examiner*—Thomas R. Hannon
*Attorney, Agent, or Firm*—Lyon, P.C.

[57] ABSTRACT

A foil air bearing for a rotatable shaft comprises a plurality of discrete air chambers disposed in a circumferential array. Each of the chambers has a radially displaceable radially inner wall for positioning a bearing foil disposed radially inwardly thereof. A like plurality of valves control the flow of pressurized air to the air chambers, respectively. Sensors respond to radial deflection of the shaft so as to control the flow of pressurized air to the chambers, selectively, thereby to compensate for radial deflection of the shaft.

7 Claims, 1 Drawing Sheet

AIR BEARING

BACKGROUND OF THE INVENTION

The present invention relates generally to bearings for rotatable shafts, and more particularly to a micro adaptive flow control foil air bearing comprising an improved multi chamber air spring that exhibits a nonlinear spring rate for controlling shaft displacement that occurs in small, high speed rotors utilized in gas turbine aircraft engines.

Gas turbine engines intended for use in highly maneuverable aircraft require shaft bearings that are of minimum size and weight yet capable of supporting the weight of the rotor shaft and turbine assembly during extreme maneuvers without deflecting to the point that the turbine blades rub against the turbine shroud. Oil lubricated rolling element bearings which accomplish this task are well known. However, certain applications have size and weight limitations that militate against the use of such oil lubricated bearings.

One solution to the size and weight problem is to use a foil air bearing in the hot section of a gas turbine engine to support the turbine end of the turbine rotor shaft. Field experience indicates that, at sea level conditions with normal loads, such known air bearings meet operating requirements. However, at high altitude and under extreme loads induced by multiple "G" maneuvers, such known air bearings permit excessive turbine rotor shaft deflection that results in the turbine rubbing its shroud, causing a loss in performance and possible damage to the engine. Excessive rotor shaft deflection in such known air bearings is due primarily to the fact that they employ a spring mounted support structure within the running gap of the bearing that exhibits a constant spring rate over all load conditions, resulting in unsatisfactory performance under extreme load conditions.

SUMMARY OF THE INVENTION

A micro adaptive flow control foil air bearing, in accordance with a preferred constructed embodiment of the present invention, solves the aforesaid problem by utilizing a multi chambered air spring, an electromechanical mixing valve system, engine shaft displacement sensors, and a control computer to actively sense and correct for variations in operating conditions and loads on the bearing to prevent damaging shaft deflections. The air bearing of the present invention is ideally suited to high performance aircraft applications which present extreme conditions of load, temperature, and speed.

More specifically, a multi chamber air spring replaces the constant rate mechanical spring that supports the foil found in conventional foil air bearings. Discrete air chambers enable the air bearing to change bearing stiffness or spring rate at a given radial position by selectively pressurizing appropriate chambers. If the shaft displacement sensor system detects that the shaft is being deflected by maneuver loading, the air spring chamber that is being compressed by the load is supplied with increased inflation pressure to counteract the deflection.

Pressure in each chamber is controlled by a discrete mixing valve for that chamber. Each mixing valve is supplied with both high and low pressure bleed air from the gas turbine engine. A dual acting spool in each mixing valve allows either high or low pressure air to flow into its associated air spring chamber. The spool is moved to either the high or low pressure port by a computer controlled electric solenoid. Under normal loads all the spring chambers receive relatively low pressure air. If the computer determines that relatively higher pressure is required in a specific air chamber to offset shaft deflection, the solenoid of the associated mixing valve moves the valve spool so as to admit air at maximum pressure to the chamber. If an intermediate pressure is required, the mixing valve solenoid is pulsed on and off so as to present a mixture of high and low pressure air to the air spring chamber. The computer that energizes the mixing valve solenoids uses input signals from a pair of shaft position sensors to determine which air spring chambers require relatively higher pressure. Sensors, for example, capacitance proximity probes, sense actual shaft displacement and determine both amplitude and angular position of the displacement. The proper air spring chambers are identified from this data and pressurized to compensate for the shaft deflection.

Accelerometers are an alternative means of predicting shaft displacement. If an accelerometer senses that the aircraft is being accelerated by a maneuver, the air bearing computer can predict from the accelerometer data that the turbine engine shaft will be displaced in a specific direction. The computer will then provide a correction signal to the solenoid of the appropriate mixing valve of the air bearing so as to feed relatively higher pressure to the air spring chamber thereof.

The system also compensates for altitude effects on the air bearing. It is well known that the load capacity of known foil air bearings decreases as ambient air pressure decreases. However, the air bearing of the present invention can be supplied with high pressure air as required so as to maintain essentially constant stiffness and damping characteristics therein. The pulse controlled mixing valves enhance the ability of the air bearing to exhibit a constant base spring rate over a wide range of aircraft operating altitudes.

Another important feature of the herein disclosed air bearing is the fabrication technology utilized to manufacture the radially deflectable bump foil support pad forming the radially inner wall of each air spring chamber. The bump foil support pad exerts a constant bias against the bump foil of the bearing and comprises a very thin deformable metallic membrane that is attached to the bearing outer wall structure. While the bump foil support pad is subject to relatively small displacements, it must move in a manner that transmits a uniform force to the bump foil of the bearing. When an air spring chamber is pressurized to the maximum air pressure, the bump foil support pad maximizes the overall stiffness of the bearing.

DETAILED DESCRIPTION OF THE PREFERRED EMBODIMENT(S)

Figure 1:
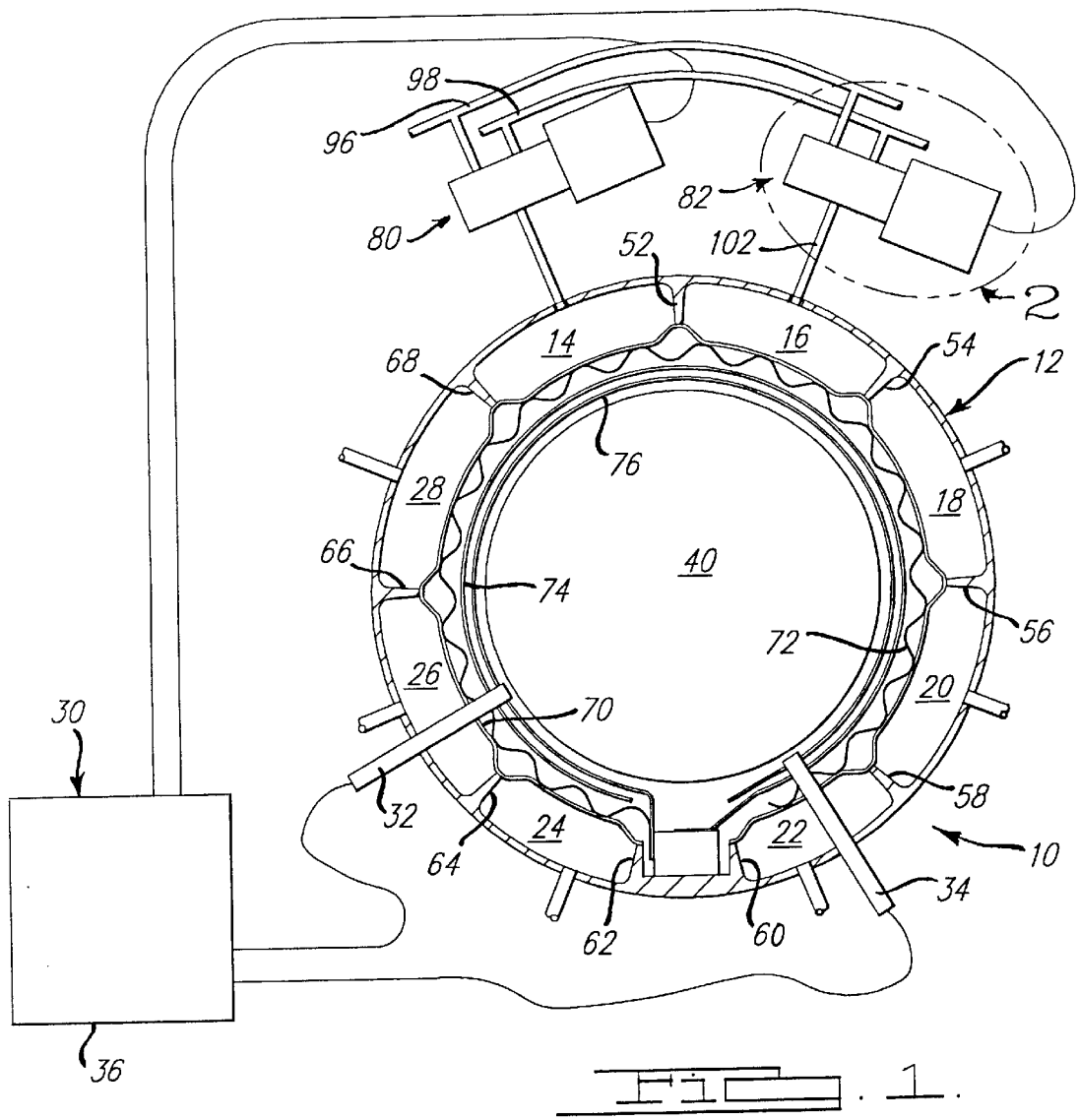
FIG. 1 is a schematic presentation of a Micro Adaptive Flow Control Foil Air Bearing in accordance with the present invention.

As seen in FIG. 1 of the drawing, a micro adaptive flow control air bearing 10 comprises a housing 12 having multiple chambers 14–28 disposed in a circumferential array. The chambers 14–28 replace the foil support pads of a conventional foil air bearing and give the bearing 10 the capability to change bearing stiffness by selectively pressurizing one or more of the air spring chambers 14–28.

A shaft displacement sensor system 30 comprises a pair of shaft position sensing probes 32 and 34 and a computerized controller 36. The sensors 32 and 34 detect deflection of a shaft 40 induced by, for example, maneuver loading. The chambers 14–28 of the air bearing 10 are supplied, selectively with air pressure sufficient to counteract deflection of the shaft 40.

Specifically, the housing 12 of the air bearing 10 comprises a plurality of radially inwardly extending segments 52–68 that define the radial walls of the air chambers 14–28, respectively. The radially inner walls of the chambers 14–28 are defined by a circumferentially extending bump foil support pad 70 that is sealably attached to and supported by the segments 52–68 of the housing 50. The bump foil support pad 70 bears against and radially positions a bump foil 72 which, in turn, positions the conventional bearing foils 74- and 76.

Figure 2:
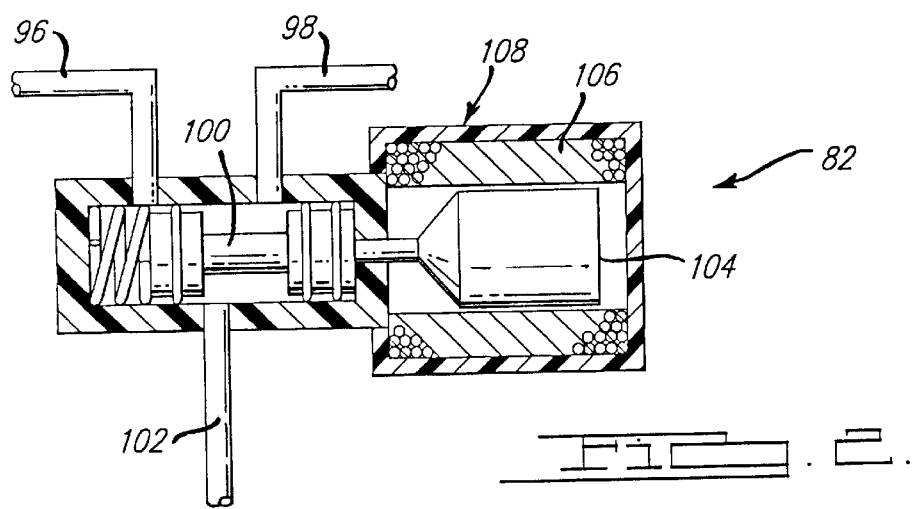
FIG. 2 is a diagramatic cross section of a mixer valve taken within the circle 2 of FIG. 1.

Pressure to the air chambers 14–28 is controlled by a like plurality of mixing valves 80–94, a representative valve being illustrated in detail in FIG. 2 and designated by numeral 82. The mixing valves 80–94 control air pressure in the chambers 14–28, respectively. The mixing valves are supplied with both high and low pressure bleed air from the gas turbine engine through conduits 96 and 98, respectively.

As seen in FIG. 2, the mixing valve 82 comprises a dual position spool 100 that normally channels low pressure air from the conduit 98 to an associated inlet conduit 102. The spool 100 of the valve 82 allows either low or high pressure air to flow into the air spring chamber 16, selectively, through the conduit 102 upon displacement of an actuator 104 due to energization of a coil 106 of an electric solenoid 108. If, for example, the air spring chamber 16 requires high pressure air to compensate for deflection of the shaft 40 in the direction thereof, as sensed by the probes 32 and 34 and integrated by the controller 30, the solenoid 108 of the valve 82 will be energized by the controller 30 so as to move the actuator 104 and poppet 100 thereof to the left, as seen in FIG. 2 of the drawing, against the bias of a return spring 101, admitting high pressure air to chamber 16 of the air bearing 10. Under normal loads all the spring chambers 14–28 receive low pressure air from the engine bleed system through conduit 98 and their associated valve.

If the controller 30 determines that the pressure required in any particular chamber 14–28 is intermediate the maximum and minimum pressures available, an intermediate pressure is achieved by cycling the associated solenoid on and off to get a mixture of high and low pressure air providing an intermediate air pressure to said air spring chamber.

The sensors 32 and 34 comprise, for example, capacitance proximity probes which sense actual displacement of the shaft 40 and determine both the amplitude and angular position of the displacement. Alternatively, accelerometers, (not shown) can be utilized to predict shaft displacement. If an accelerometer senses that the aircraft is accelerating due to a maneuver, the controller 30 can predict from the accelerometer data that the shaft 40 will be displaced in a specific direction. The controller 30 will then provide correction data to the appropriate mixing valves 80–94 and feed more pressure to one or more of the air spring chambers 14–28.

It is well known that the load capacity of foil air bearings decreases as air pressure within the bearing decreases. However, the air bearing of the present invention compensates for altitude effects on the bearing by utilizing higher pressure bleed air as altitude increases. Thus, the load capacity and damping characteristics of the bearing remain relatively constant.

Another important feature of the present invention is the fabrication method of the bump foil support pad 70 that defines the radially inner wall of the air spring chambers 14–28. The bump foil support pad 70 comprises a very thin metallic membrane that is formed on a die and then laser welded to the radially extending segments 52–68 of the housing 12. An alternative approach is to electroform the bump foil support pad 70 over a precision mandrel that is etched out after the electroforming process is complete.

While the preferred embodiment of the invention has been disclosed, it should be appreciated that the invention is susceptible of modification without departing from the scope of the following claims.

I claim:

1. A foil air bearing for a rotatable shaft comprising:

an annular housing;

a plurality of discrete air chambers disposed in a circumferential array about the radially inner periphery of said housing, each of said chambers having a radially displaceable radially inner wall;

a bearing foil disposed radially inwardly of the inner wall of said air chamber;

a plurality of valves for controlling the flow of pressurized air to said air chambers, respectively; and means for sensing radial deflection of said shaft having an output for controlling said valves, selectively, so as to control the flow of pressurized air to said chambers, respectively, thereby to compensate for radial deflection of said shaft.

2. The air bearing of claim 1 wherein said air flow control valves admit either high or low pressure air to said air chambers, selectively.

3. The air bearing of claim 1 wherein a bump foil is interposed between said foil and said air chamber.

4. The bearing of claim 3 wherein the radially inner wall of said air chambers bear directly on said bump foil.

5. The bearing of claim 1 comprising a pair of bearing foils disposed radially inwardly of said bump foil.

6. The bearing of claim 1 wherein said air flow control valves comprise a dual position spool.

7. The bearing of claim 1 wherein said sensing means comprises a pair of capacitive proximity probes orientated at 90 degrees relative to one another.

* * * * *